Feb. 12, 1957
R. C. JAYE
2,780,896
APPARATUS FOR CUTTING PIPE COVER
SECTIONS FROM CELLULAR MATERIAL
Filed March 14, 1955
3 Sheets-Sheet 1
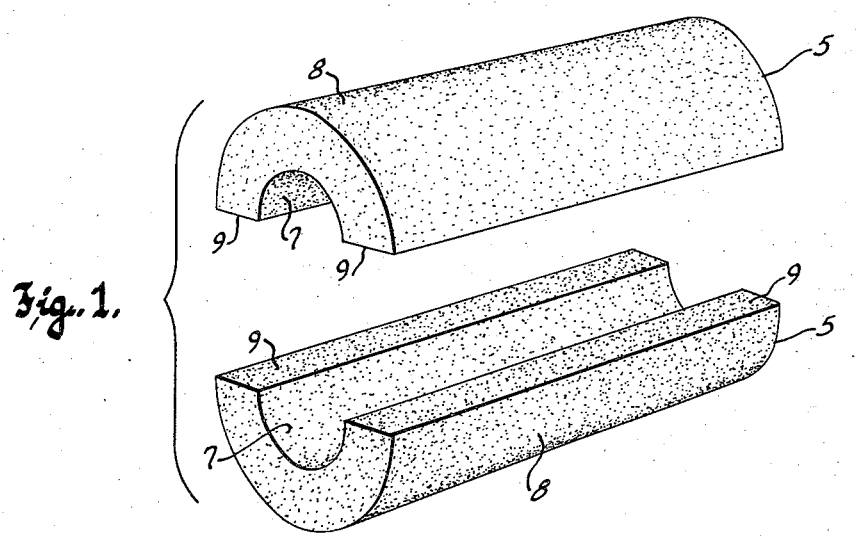
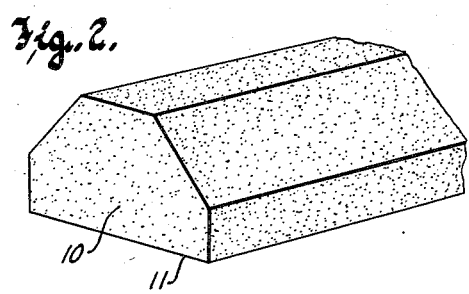 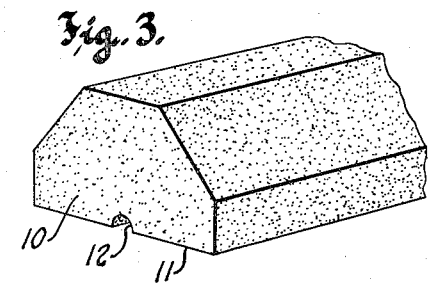
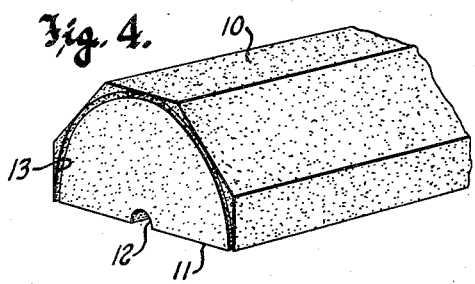 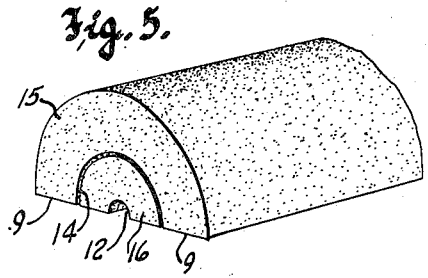
Inventor
Richard C. Jaye

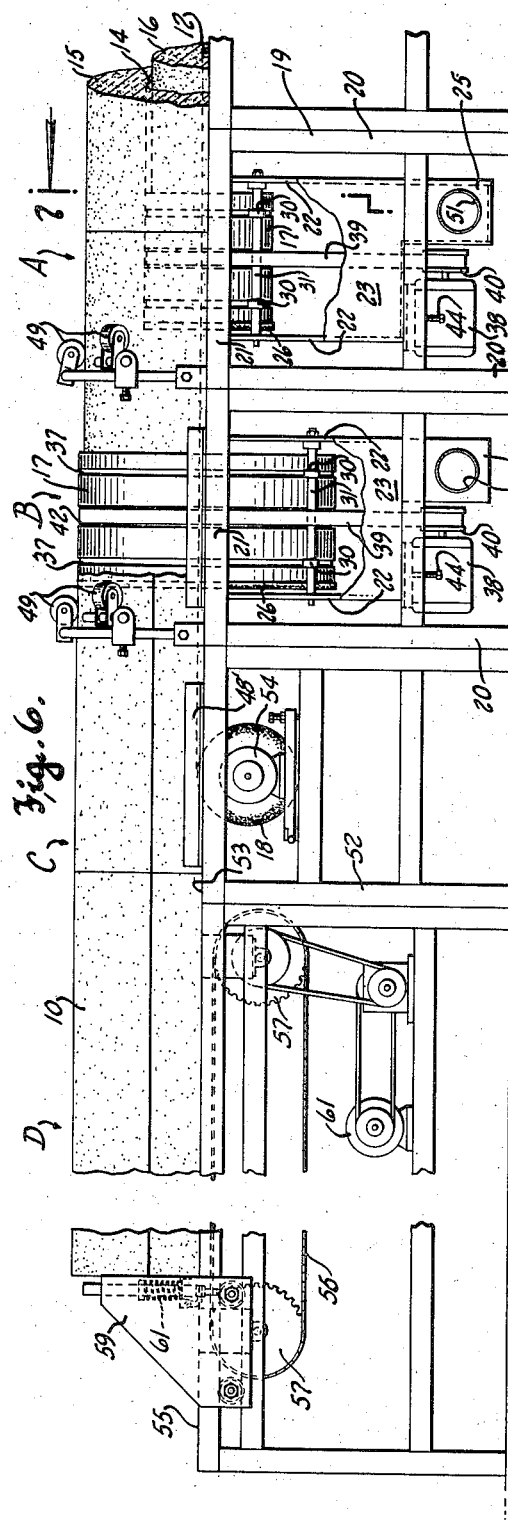

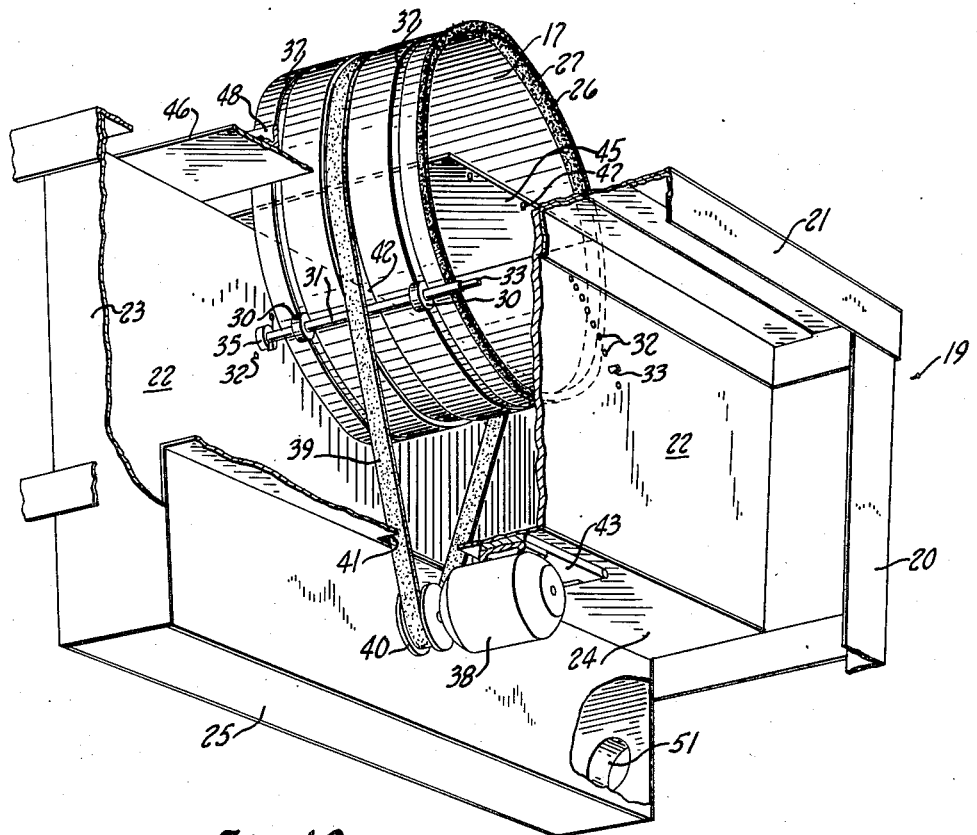
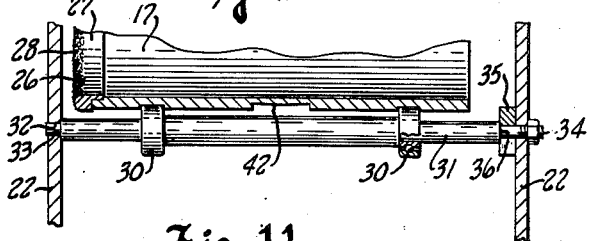
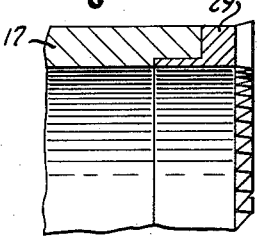
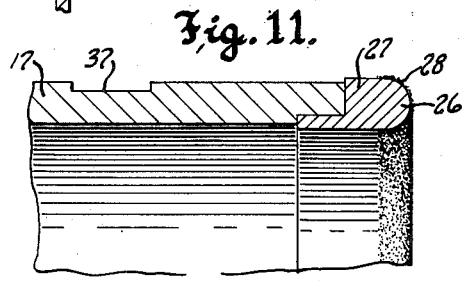

United States Patent Office 2,780,896
Patented Feb. 12, 1957

2,780,896

APPARATUS FOR CUTTING PIPE COVER SECTIONS FROM CELLULAR MATERIAL

Richard C. Jaye, Watertown, Wis., assignor to The Jaye Corporation, Watertown, Wis., a corporation of Wisconsin Application March 14, 1955, Serial No. 493,888

3 Claims. (Cl. 51—110)

This invention relates to the fabrication of cellular material such as the expanded thermo-plastic available upon the market under the trade-mark "Styrofoam" and the cellular material made of glass and known by the trademark "Foamglas"; and has as its primary purpose to provide a commercially practicable method and apparatus for cutting pipe cover sections and similar articles of manufacture from such cellular material.

One of the important objects of the invention is to provide a method and apparatus for the purpose set forth by which billets of the cellular material may be cut into semi-circular pipe cover sections with a minimum waste of material.

Another object of this invention is to provide a method and apparatus whereby more than one size of pipe cover section may be cut from a billet of the material in one continuous operation, with the small size pipe cover sections being cut from the cores formed by the cutting of the larger pipe cover sections.

Another object of this invention is to provide a method and apparatus for cutting semi-circular pipe cover sections from cellular material whereby a single cut defines both the inner concave surface of one size pipe cover, and the outer convex side of a smaller pipe cover.

With the above and other objects in view, which will appear as the description proceeds, this invention resides in the novel method and construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode and method so far devised for the practical application of the principles thereof, and in which:

Figure 1 is a perspective view illustrating two complementary pipe cover sections of the type contemplated by this invention;

Figure 2 is a perspective view illustrating one end portion of a billet from which a large and a small size pipe cover section may be cut;

Figure 3 is a perspective view of the billet after the first operation performed by the apparatus of this invention;

Figure 4 is a perspective view of the billet illustrating the same at the completion of the next successive operation of the apparatus;

Figure 5 is a perspective view of the two pipe cover sections in the nested relation they occupy at the completion of the following operation of the apparatus;

Figure 6 is a side elevational view of the apparatus of this invention with parts thereof broken away to illustrate details;

Figure 7 is a cross sectional view through Figure 6 on the plane of the line 7—7;

Figure 8 is a perspective view of the feed mechanism of the apparatus by which billets are fed through the apparatus;

Figure 9 is a perspective view of one of the cutting stages of the apparatus and illustrating especially the cutting cylinder thereof and the manner in which it is mounted and driven;

Figure 10 is a detail view of one of the supports for the cutting cylinder;

Figure 11 is a fragmentary sectional view through a portion of the cutting cylinder to illustrate particularly the cutting edge portion of the cylinder; and Figure 12 is a fragmentary sectional view similar to Figure 11 but illustrating a slightly modified form of cutting edge.

The pipe cover sections produced by the method and with the apparatus of this invention, as shown in Figure 1 of the accompanying drawings, comprise rigid elongated members 5 semi-circular in cross section so as to cover one half of the circumference of the pipe. Hence, each section or member 5 has a concave semi-cylindrical inner surface 7, and a convex semi-cylindrical outer surface 8; and these curved inner and outer surfaces are joined by flat faces 9. Obviously, therefore, in the application of the cover sections to a pipe, the flat faces 9 of one section have surface to surface engagement with those of the mating section. Any suitable way of holding the mating sections together and about the pipe may be employed, but cohesive coatings on the flat surfaces 9 as taught in the copending application of Richard C. Jaye, Serial No. 368,723, is recommended.

If the pipe cover sections are formed of Styrofoam, they can be cut from billets or blocks of this material with the hot wire method disclosed in Patent No. 2,677,-747, issued May 4, 1954, but if Foamglas is used, the hot wire method is inapplicable, since Foamglas being a cellular glass material, cannot be cut or fabricated in that way. On the other hand, the method of this invention is not limited to either of these two materials. In fact it can be employed in the fabrication or shaping of a wide variety of materials. Any material that can be cut or shaped by sawing or grinding can be handled.

In the preferred practice of the method, a billet 10 of the selected material is first prepared so as to have at least one flat surface 11, preferably its bottom; the other sides of the billet need not be even or smooth, though it is desirable that the billet have at least one straight side 11′ perpendicular to its flat bottom. In cross section the billet must be at least as large as the cross sectional area of the largest size pipe cover section to be cut therefrom, and where a relatively large size cover is being produced, it is desirable to cut off the upper corners of the billet and give it the semi-octagonal cross sectional shape as shown in Figure 2. The corner portions could then be used for small size pipe covers or some other purpose.

The billet thus prepared has a round-bottomed groove 12 cut in its flat underside 11. This is preferably done by moving the billet linearly across a flat supporting surface and over an approximately shaped cutter. Although the cutter used for this purpose may be any one of a wide variety of types, it has been found entirely practicable and advantageous to use a wooden wheel having a rounded periphery coated with abrasive particles, and revolving on an axis disposed crosswise of the path of movement of the billet and beneath the supporting surface over which the billet moves.

After the groove 12 has been cut into the flat underside 11, the billet is then fed axially against one end of a rotating hollow cylinder. Preferably this is done by simply continuing the linear movement of the billet after the groove has been formed, in which case the hollow cylinder must be mounted with its axis parallel to the direction of the movement of the billet. Also, the axis of rotation of the cylinder should lie on the plane along which the flat underside of the billet moves. The end of the cylinder against which the billet is fed should be capable of cutting or abrading the material, and again it has been found satisfactory and entirely practicable to merely coat the end of the cylinder with abrasive particles.

As the billet is moved axially through and past the hollow cylinder, an arcuate slot 13 is cut longitudinally therein. This slot as shown in Figure 4, separates the billet into two pieces, one within the other. The outer piece is discarded; but from the inner piece, one or more pipe cover sections are cut.

After the formation of the cut or slot 13, the billet is again fed against the end of a rotating hollow cylinder, which, however, is smaller in diameter than the first cylinder; and in the manner described, this smaller rotating hollow cylinder cuts another arcuate slot 14 through the billet to divide the same into a large pipe cover section 15 and a smaller pipe cover section 16, both of which have the desired semi-circular cross sectional shape.

It is important and significant that the smaller section 16 is formed from the core portion which is cut from the billet in forming the larger pipe cover section, and that the inner semi-cylindrical concave surface 7 of the large pipe cover section, and the concave semi-cylindrical outer surface 8 of the smaller pipe cover section, are formed simultaneously.

While the drawing and the foregoing description illustrates and describes only the production of two sizes of pipe cover, it will, of course, be readily understood that three or even more sizes of pipe cover can be produced by this method, all in one continuous operation, and that to do so requires merely multiplying the number of the cutting stations and starting with a billet of larger cross section, or alternatively reducing the wall thickness of the cover sections.

It will also be readily understood that the groove 12, which forms the inside surface of the small cover section, can be formed after the last of the arcuate slots has been cut through the billet, as well as before the cutting of the arcuate slots as described.

*The apparatus*

The apparatus of this invention as disclosed in Figures 6 to 12 inclusive, comprises two cutting stations, A and B, at which arcuate semi-circular slots are cut through the billet; a third cutting station or unit C at which a small groove is cut in the underside of the billet; and a feeding unit D which feeds the billets to and through the cutting stations; it being understood that all these stations or units are arranged in one tandem.

Each of the cutting stations A and B has a hollow rotating cylinder 17 which provides its cutting element, and the station or unit C has a cutter wheel 18 mounted to rotate about an axis crosswise of the axes of the cylinders 17.

Although the several stations A to D inclusive have been shown as independent units, it is of course, possible that all of them, or at least the three cutting units, could be parts of one composite machine.

Of the entire apparatus, the cutting stations or units A and B are undoubtedly the most important. Each of these stations has a suitable supporting structure indicated generally by the numeral 19, fabricated from structural steel, and having four legs 20, connected at the top by a rectangular frame 21 of angle iron. Supported in this frame are two spaced apart parallel upright walls 22 of relatively heavy plate with the upper edges thereof in line with the top of the angle iron frame 21. These upright walls 22 are connected by lighter end walls 23, and a bottom wall 24, which is provided with a depending hopper 25. The arrangement described thus provides a box like structure in which the cylinder 17 of the unit is mounted with its axis perpendicular to the supporting walls 22, and substantially lying on the plane of the top of the angle iron frame 21.

The cylinder 17 has a relatively thin wall but definitely must have sufficient rigidity to preclude deformation, and to assure smooth operation it must be perfectly round. One end of the cylinder provides an abrading or cutting edge 26, which as best shown in Figures 11 and 12, is preferably provided by a detachable ring 27, suitably secured to the cylinder.

In the preferred embodiment of the invention, the ring 27 has a rounded outer edge coated with particles of Carborundum as at 28. The Carborundum particles may be applied to the ring in any suitable manner, as for instance by coating the rounded edge of the ring with glue and sprinkling the Carborundum particles thereon before the glue sets. If desired, a milled cutter ring 29 as shown in Figure 12, may be substituted for the Carborundum coated ring 27. In either event, the ring has teeth to cut the material to be handled. In the case of the Carborundum coated ring, the abrasive particles constitute the teeth; and also in either event the cut formed by the cutting edge of the cylinder must be wider than the thickness of the cylinder.

The cylinder is freely rotatably mounted and supported in position by horizontally spaced rollers 30 mounted between the upright walls 22 to rotate about axes equispaced from the desired location of the center of the cylinder, and since it is desirable to accommodate cylinders of different diameters, the mounting for the supporting rollers 30 is adjustable toward and from the desired location of the cylinder axis.

The specific construction of the rollers 30, is of course, susceptible to variation, but it has been found desirable to employ ball bearings for this purpose and to mount these bearings upon a shaft 31, the inner races of the bearings being force fitted onto the opposite end portions of the shaft. This shaft is then detachably secured in any one of a plurality of sets of opposite holes 32 in the walls 22, the selection of the holes being determined by the diameter of the cylinder.

Again, the specific manner of mounting the shafts 31 in the holes 32 is not important, but it has been found practicable to do so in the manner shown in Figure 10. In this case one end of the shaft 31 has a short trunnion 33 engageable in the selected hole 32 of one of the walls 22, and a longer trunnion 34 on its opposite end to engage in the proper hole in the other wall 22. Thus, in mounting the shaft, the longer trunnion 34 is first inserted into the proper hole and moved far enough into it to allow the shorter trunnion to be engaged in its hole. Thereafter, a clevis 35 is interposed between the shoulder 36 on the shaft from which the trunnion 34 projects and the adjacent wall 22, and finally a nut is threaded onto the outer end of the trunnion 34. The shaft 31 is thus securely held in position in a manner enabling quick removal thereof to permit the same to be mounted in another set of the holes 32 when it is desired to accommodate a cutting cylinder of different diameter.

The cylinder 17 rests upon the outer races of the bearings 30 which run in tracks formed by annular grooves 37 in the outer wall of the cylinder. In this manner the bearings 30 not only support the cylinder for rotation, but also hold it against endwise displacement and carry the end thrust imposed upon the cylinder during the cutting operation.

The cylinder is rotated by power means preferably consisting of an electric motor 38 mounted beneath the cylinder and drivingly connected therewith by a belt 39 trained about the cylinder and over a drive pulley 40 on the motor shaft, the belt passing through an opening 41 in the bottom wall of the box like frame structure. Since it is important that both the inside and outside walls of the upper half of the cylinder be unobstructed, the belt 39 runs in a groove 42 in the cylinder wall so that no portion thereof projects above the outer surface of the upper half of the cylinder.

It should be noted that this manner of driving the cylinder has the advantage of also holding the cylinder down on its supporting rollers, and to assure that the belt 39 will have the proper tension for its driving and hold-down functions, the motor 38 is adjustably mounted as by means of a hinged baseplate 43 adapted to be swung down to tighten the belt, by means of an adjusting screw 44.

The cutting done by the cylinder 17 is performed by the upper half thereof so that the cut formed in the material fed to the cylinder will be a semi-circular slot. This, of course, requires that the material fed to the cutting cylinder be supported with its underside on a plane containing the axis of the cylinder. To this end a track structure is provided to support and guide the material as it is fed against and through the cylinder. This track structure preferably consists of a center plate 45 spanning and resting on the upper edges of the upright walls 22 inside the cylinder and side plates 46 also spanning and resting on the upper edges of the walls 22 at opposite sides of the cylinder. Dowel pins 47 projecting downwardly from these plates enter appropriately located holes in the edges of the walls 22 to hold the plates in proper position.

To guide the block or billet of material for linear motion against and through the cylinder, the side plates 46 have guide rails 48 extending upwardly therefrom and disposed in parallel relation to the axis of the cylinder. The setting of these guide rails 48 is determined by the overall width of the block or billet to be accommodated, and in the apparatus illustrated where two of the cylinder cutting stations are employed, the spacing between the guide rails 48 is such as to accommodate the width of the billet 10 shown in Figure 2.

Each of the cutting stations A and B also has a set of "hold down" rollers 49 suitably mounted to engage the block or billet as it passes, and biased by springs 50 to hold the billet down on the track or supporting table provided by the plates 45 and 46.

The dust and particles of material cut from the billets or blocks as they pass through the cutting stations drops into the hoppers 25 from which it is withdrawn through openings 51 by suitable suction means not shown.

The cutting station C consists simply of a supporting frame 52 having a top wall or table 53 flush with the track provided by the plates 45 and 46 so as to enable the blocks or billets of material to be slid smoothly thereacross and against the cutting edge of the first cylinder cutting station B. Guide rails 48' hold the blocks or billets in proper position as they travel across the table 53.

The cutting wheel 18 of the station C is mounted at such an elevation that its rounded abrasive periphery projects above the table 53 just far enough to cut the groove 12 into the flat underside of the billet as it moves thereover. Obviously, of course, the wheel 18 must be mounted to rotate about an axis parallel to the flat table 53, and the wheel must be equispaced from the guide rails 48'. Any suitable manner of mounting and driving the wheel 18 may be employed, and in the structure shown, it is fastened directly to the shaft of a motor 54 vertically adjustably mounted on the frame 52.

The feed station D may be of any suitable design or construction, and in the present instance has been shown as comprising a table top 55 suitably supported on legs and flush with the table top 53 of the cutting station C. Beneath the table top 55 is an endless chain 56 trained about sprockets 57 so disposed that the upper stretch of the chain lies directly beneath the table in line with a slot 58 therein. A pusher 59 mounted to move longitudinally along the table 55, is adapted to be connected to the chain by means of a pawl arrangement 60.

The chain 56 is driven from the electric motor 61 through suitable transmission means so that when the pawl 60 is engaged with one of the links of the chain, the pusher 59 will be advanced toward the first cutting station to thereby move a billet or block of material forwardly and feed the same to the succession of cutting stations. When the pusher 59 reaches the end of the chain nearest the station C, its pawl 60 is automatically disengaged from the chain and then held in an elevated position by a spring 61 so that the operator may retract the pusher in preparation for the loading of another billet.

*Operation of the apparatus*

In the operation of the apparatus shown, all of the electric motors must, of course, be running. As a result, the cylinders 17 of the stations A and B will be rotating, and it is important to observe that these cylinders are in exact axial alignment and that one of them is smaller than the other. A billet preferably prepared so that it has at least its under surface flat, is then loaded onto the feed station D ahead of the pusher 59 with the pawl 60 of the pusher engaged with the feed chain, and the billet is advanced across the table 53 of the cutting station C, passing between the guide rails 48'. As the billet moves across the station C, the cutter wheel 18 cuts a round-bottomed groove in the underside of the billet.

From the station C the advancing billet moves onto the first cylinder cutting station B. Here the leading end of the billet is forcibly fed directly and squarely against the cutting edge 26 on the rotating cylinder 17, being guided and held by the track formed by the plates 45 and 46, the guide rails 48, and the hold-down rollers 49. During its passage across or through the station B, the rotating cylinder of this station cuts a semi-circular relatively narrow slot in the billet, and thereby divides the billet into an inner piece and an outer piece; the outer piece being waste is discarded.

Continuing its advance, the billet then leaves the station B and moves onto and through the station A. Here it engages the cutting edge of the smaller cylinder 17, which also cuts a semi-circular slot longitudinally through the billet and divides it into two nesting different sized pipe cover sections. It is especially significant and important to observe that the cylinder 17 of the station A simultaneously forms the concave inner surface of a large size pipe cover section and the convex outer surface of a smaller size pipe cover section, and that in so doing, very little material is wasted.

From the foregoing description taken with the accompanying drawings, it will be readily apparent to those skilled in the art, that this invention greatly facilitates the fabrication or cutting of pipe cover sections from such materials as Styrofoam and Foamglas, and that it effects a significant saving in material as well as cost.

What is claimed as my invention is:

1. Apparatus of the character described comprising: horizontal table means; rigid spaced apart walls connected to said table means and extending downwardly therefrom; a thin but rigid cylinder having cutter means on one end thereof and having three axially equispaced annular grooves in its exterior; means supporting said cylinder for rotation about its axis but with said axis coincident with the top of the table means and the cylinder encircling the latter so that the lower half of the cylinder extends lengthwise between said downwardly extending walls, said cylinder mounting means comprising a pair of spaced apart supporting shafts confined lengthwise between and carried by said upright walls in parallel relationship to the cylinder axis, one adjacent to each external side of the lower half of the cylinder, and a pair of ball bearings on each shaft having their outer races engaged in the endmost annular grooves in the exterior of the cylinder and having their inner races fixed on the shaft, whereby said ball bearings freely rotatably support the cylinder for rotation on its axis and at the same time prevent axial movement of the cylinder relative to the table means; a power driven pulley under and spaced from the cylinder; and a belt trained over said pulley and about the centrally grooved portion of the cylinder so that the belt not only transmits rotation to the cylinder but also holds the cylinder down on the ball bearings on said supporting shafts.

2. The apparatus set forth in claim 1 further characterized by the fact that said spaced downwardly extending walls are provided with paired sets of supports for the supporting shafts spaced successively greater distances from the table means and from a vertical plane containing the cylinder axis so that said shafts may be mounted at different elevations and cylinders of different diameters may be supported upon the ball bearings thereof and held thereby with the axes of the cylinders in the plane of the top of the table means.

3. The apparatus set forth in claim 2 further characterized by the fact that said paired sets of supports for the supporting shafts are holes in the downwardly extending walls, to receive the opposite ends of the shafts; and means readily detachably holding said supporting shafts with their ends received in any of said paired sets of holes in the downwardly extending walls.

References Cited in the file of this patent
UNITED STATES PATENTS

| Number | Name | Date |
|---|---|---|
| 22,792 | Field | Feb. 1, 1859 |
| 300,784 | Lucas | June 24, 1884 |
| 397,727 | King | Feb. 12, 1889 |
| 581,183 | Tope et al. | Apr. 20, 1897 |
| 1,054,006 | Lentz | Feb. 25, 1913 |
| 1,904,274 | Crowley | Apr. 18, 1933 |
| 2,136,359 | Bley et al. | Nov. 15, 1938 |
| 2,182,562 | Koebel | Dec. 5, 1939 |
| 2,326,908 | Williams | Aug. 17, 1943 |